(12) United States Patent
Kurashige (10) Patent No.: US 10,992,912 B2
(45) Date of Patent: Apr. 27, 2021

(54) ILLUMINATION DEVICE, PROJECTION APPARATUS, LENS ARRAY, AND OPTICAL MODULE

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 57 days.

(21) Appl. No.: 15/041,192

(22) Filed: Feb. 11, 2016

(65) Prior Publication Data

US 2016/0182871 A1 Jun. 23, 2016

Related U.S. Application Data

(63) Continuation of application No. PCT/JP2014/071037, filed on Aug. 8, 2014.

(30) Foreign Application Priority Data

Aug. 12, 2013 (JP) .............................. JP2013-167695
Jul. 22, 2014 (JP) .............................. JP2014-149194

(51) Int. Cl.
*H04N 9/31* (2006.01)
*G03B 21/20* (2006.01)
(Continued)

(52) U.S. Cl.
CPC ......... *H04N 9/3152* (2013.01); *G02B 3/0043* (2013.01); *G02B 3/0062* (2013.01);
(Continued)

(58) Field of Classification Search
CPC .... G02B 3/0043; G02B 3/0037; G02B 3/006; G02B 27/00–648; G02B 27/01–0189;
(Continued)

(56) References Cited

U.S. PATENT DOCUMENTS 4,912,613 A 3/1990 Sanborn
6,062,695 A * 5/2000 Kakuda ............... G02B 27/283
348/E9.027
(Continued)

FOREIGN PATENT DOCUMENTS

CN 101788712 A 7/2010
CN 101874212 A 10/2010
(Continued)

OTHER PUBLICATIONS

International Search Report and Written Opinion (Application No. PCT/JP2014/071037) dated Nov. 11, 2014.
(Continued)

*Primary Examiner* — Christina A Riddle
*Assistant Examiner* — Christopher A Lamb, II
(74) *Attorney, Agent, or Firm* — Burr & Brown, PLLC (57) ABSTRACT

An illumination device has a plurality of first lens elements to collect incident light beams, and a field lens to guide each of the light beams that have passed through the plurality of first lens elements to an entire region of a specific area. The plurality of first lens elements include at least two first lens elements having different lens diameters from each other. When one of the two first lens elements has a lens diameter d and a focal length f, another of the two first lens elements has a lens diameter k×d (where k is a value larger than zero but other than 1) and a focal length k×f.

14 Claims, 8 Drawing Sheets

(51) Int. Cl.
  *G02B 27/09* (2006.01)
  *G02B 26/08* (2006.01)
  *G02B 3/00* (2006.01)
  *G02B 3/06* (2006.01)
  *G02B 26/10* (2006.01)
  *G02B 27/48* (2006.01)

(52) U.S. Cl.
  CPC ............ *G02B 3/06* (2013.01); *G02B 26/0833* (2013.01); *G02B 26/10* (2013.01); *G02B 27/0927* (2013.01); *G02B 27/0961* (2013.01); *G02B 27/0966* (2013.01); *G02B 27/48* (2013.01); *G03B 21/208* (2013.01); *H04N 9/317* (2013.01); *H04N 9/3129* (2013.01); *H04N 9/3161* (2013.01)

(58) Field of Classification Search
  CPC ..... G02B 2027/0105–0198; G02B 3/00–0087; H04N 9/3152; H04N 9/3129; H04N 9/31–3197; G03B 21/00–64
  See application file for complete search history.

(56) References Cited

U.S. PATENT DOCUMENTS

| | | | |
|---|---|---|---|
| 7,736,029 B2 | 6/2010 | Chen et al. | |
| 8,757,849 B2 | 6/2014 | Brick et al. | |
| 2004/0008411 A1 | 1/2004 | Freese et al. | |
| 2005/0281029 A1 | 12/2005 | Inamoto | |
| 2007/0127245 A1* | 6/2007 | Magarill | G02B 27/0927 362/291 |
| 2009/0002638 A1* | 1/2009 | Lee | G03B 21/28 353/31 |
| 2009/0201588 A1 | 8/2009 | Tanaka et al. | |
| 2011/0075108 A1* | 3/2011 | Kojima | G03B 21/20 353/38 |
| 2011/0234985 A1* | 9/2011 | Ryf | G03B 21/14 353/38 |
| 2013/0021581 A1* | 1/2013 | Takahashi | H01S 5/02292 353/31 |
| 2013/0250269 A1* | 9/2013 | Ishida | G02B 27/48 355/71 |
| 2013/0258294 A1* | 10/2013 | Kaneda | G02B 27/48 353/38 |
| 2014/0198303 A1* | 7/2014 | Wang | H04N 9/3161 353/38 |
| 2015/0055100 A1* | 2/2015 | Kaneda | G02B 3/0043 353/38 |

FOREIGN PATENT DOCUMENTS

| | | |
|---|---|---|
| EP | 0 563 874 A1 | 10/1993 |
| JP | 2000-155201 A1 | 6/2000 |
| JP | 2002-090884 A1 | 3/2002 |
| JP | 2005-352205 A1 | 12/2005 |
| JP | 2005-352392 A1 | 12/2005 |
| JP | 2009-518812 A1 | 5/2009 |
| JP | 2009-186923 A1 | 8/2009 |
| JP | 2012-048832 A1 | 3/2012 |
| TW | 200928437 A | 7/2009 |

OTHER PUBLICATIONS

Chinese Office Action (With English Translation), Chinese Application No. 201480044747.5, dated Feb. 6, 2017 (14 pages).

* cited by examiner

ILLUMINATION DEVICE, PROJECTION APPARATUS, LENS ARRAY, AND OPTICAL MODULE

BACKGROUND OF THE INVENTION

1. Field of the Invention

The present disclosure relates to an illumination device, a projection apparatus, a lens array, and an optical module, which use a plurality of lens elements.

2. Description of Related Art

There is a known technique to uniformly illuminate a specific area using a lens array and a field lens.

Figure 6:
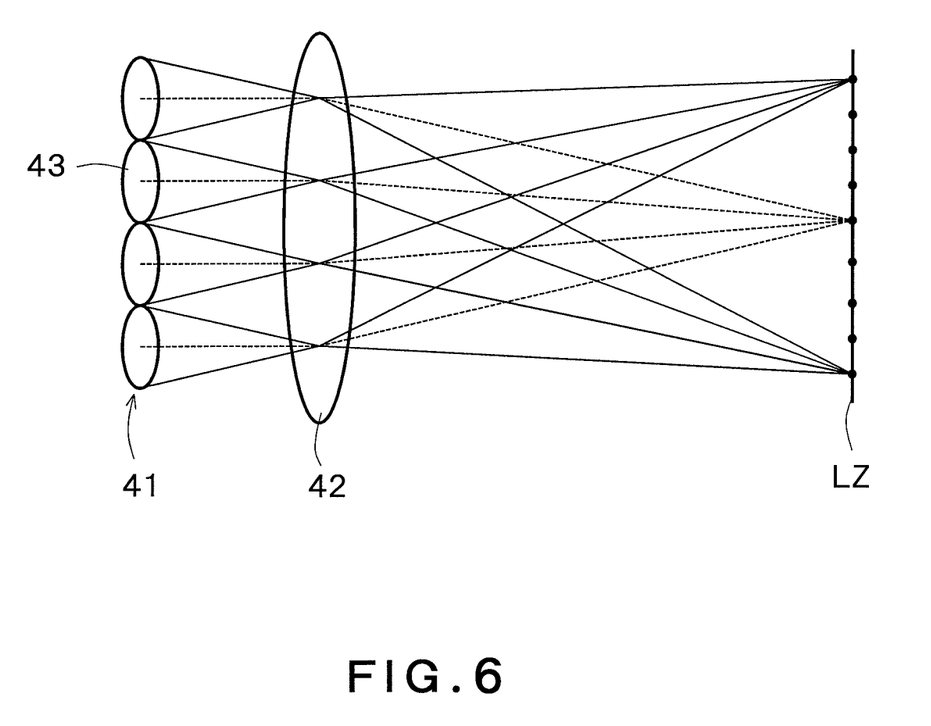
FIG. 6 is a diagram explaining an optical system of an illumination device.

FIG. 6 is a diagram explaining an optical system of an illumination device using such a known technique. A field lens 42 is located on the focal point of a lens array 41 having a plurality of lens elements 43. An illumination zone LZ is located on the focal point of the field lens 42. Parallel beams from a light source (not shown) are incident on the lens elements 43.

In FIG. 6, light beams that have passed through the lens elements 43 are collected entirely by the field lens 42 to illuminate the entire region of the illumination zone LZ.

As described above, the light beams that have passed through any of the lens elements 43 illuminate the same illumination zone LZ. The illumination zone LZ is obtained by overlapping intensity distribution of the light beams from the lens elements 43.

SUMMARY OF THE INVENTION

Figure 10:
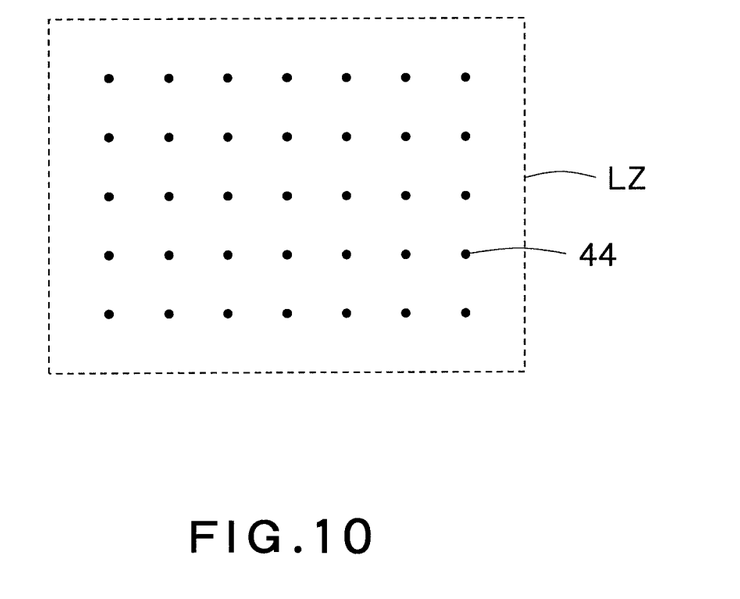
FIG. 10 is a view showing an example of bright spots.

When a coherent light source is used as the light source, with the lens elements 43 of the lens array 41 having the same lens diameter and the same pitch therebetween, however, regular incidence angle distributions are overlapped on the illumination zone LZ to generate a regular interference pattern on the illumination zone LZ. Therefore, if a laser light source of high coherency is used as the light source, regular bright spots 44 appear in the illumination zone LZ, as shown in FIG. 10, which hinders uniform illumination.

In order to prevent the generation of such bright spots 44, a rotary diffuser plate may be disposed closer to the light source side than to the lens array 41 or the lens array 41 may be vibrated. Such arrangements, however, make the structure of the optical system complicated.

In view of the above problems, a purpose of the present invention is to provide an illumination device, a projection apparatus, a lens array, and an optical module, for achieving uniform illumination without a complicated optical system structure.

In order to solve the problems above, according to an aspect of the present invention, there is provided an illumination device has a plurality of first lens elements to collect incident light beams, and a field lens to guide each of the light beams that have passed through the plurality of first lens elements to an entire region of a specific area. The plurality of first lens elements include at least two first lens elements having different lens diameters from each other, and when one of the two first lens elements has a lens diameter d and a focal length f, another of the two first lens elements has a lens diameter k×d (where k is a value larger than zero but other than 1) and a focal length k×f.

The plurality of first lens elements may have two or more first lens elements arranged in a first direction and two or more first lens elements arranged in a second direction that intersects with the first direction, at least part of the two or more first lens elements arranged in the first direction lens may have a lens diameter different from the other lens element, and at least part of the two or more first lens elements arranged in the second direction may have a lens diameter different from the other lens element.

The plurality of first lens elements may be a lens array having two or more first lens elements arranged in each of the first and second directions.

The plurality of first lens elements may have a circular or rectangular shape in a plan view.

The plurality of first lens elements may have a semi-cylindrical shape in a cross-section view, and the plurality of first lens elements may have a first cylindrical lens unit having two or more first lens elements arranged in the first direction and a second cylindrical lens unit having two or more first lens elements arranged in the second direction.

The plurality of first lens elements may be a toroidal lens array having a plurality of toroidal lenses arranged in a direction in which the plurality of first lens elements are arranged, and at least part of the toroidal lenses arranged in the direction may have different pitches.

The toroidal lens array may have a plurality of toroidal lenses arranged in the first direction and the second direction intersecting with each other, and at least part of the toroidal lenses arranged in the first direction may have different pitches and the toroidal lenses arranged in the second direction may have a constant pitch.

The toroidal lens array may have a plurality of toroidal lenses arranged in the first direction and the second direction intersecting with each other, and at least part of the toroidal lenses arranged in each direction may have different pitches.

When the plurality of toroidal lenses have different numbers of toroidal lenses in the first and second directions, a smaller number of the toroidal lenses may be used as the plurality of first lens elements.

The specific area may be set closer to a focal plane of the field lens.

The illumination device may have a light source to emit a coherent light beam, and a scanning device to change a travel direction of the coherent light beam emitted from the light source to scan the plurality of first lens elements with the coherent light beam.

The illumination device may have a plurality of second lens elements disposed in an optical path between the plurality of first lens elements and the field lens, the plurality of second lens elements corresponding to the plurality of first lens elements, each of the plurality of second lens elements has a lens diameter equal to the corresponding first lens element, the plurality of second lens elements having a common focal length, and an optical path length between the corresponding first and second lens elements is equal to the common focal length.

A projection apparatus may be provided, which has the illumination unit described above, a spatial light modulator disposed in the specific area, to generate a modulated image when illuminated with a coherent light beam that passes through the specific area, and a projection optical system to project the modulated image onto a diffuser plane.

According to another aspect of the present invention, there is provided a lens array that has a plurality of lens elements to collect incident light beams, wherein at least part of the plurality of lens elements has different lens diameters, and when one of two first lens elements having different lens diameters has a lens diameter d and a focal length f, the other of the two first lens elements has a lens diameter k×d (where k is a value larger than zero but other than 1) and a focal length k×f.

According to another aspect of the present invention, there is provided an optical module that has a plurality of lens elements to collect incident light beams emitted from a light source, a field lens to guide each of the light beams that have passed through the plurality of lens elements to an entire region of a specific area, and a scanning device to change a travel direction of the coherent light beams emitted from light source to scan the plurality of lens elements with the coherent light beams, wherein at least part of the plurality of lens elements has lens diameter different from the other lens elements, and when one of two first lens elements having different lens diameters has a lens diameter d and a focal length f, another of the two first lens elements has a lens diameter k×d (where k is a value larger than zero but other than 1) and a focal length k×f.

According to the present invention, uniform illumination is achieved without a complicated optical system structure.

DETAILED DESCRIPTION OF THE INVENTION

Hereinafter, embodiments of the present invention will be explained in detail.

First Embodiment

Figure 1:
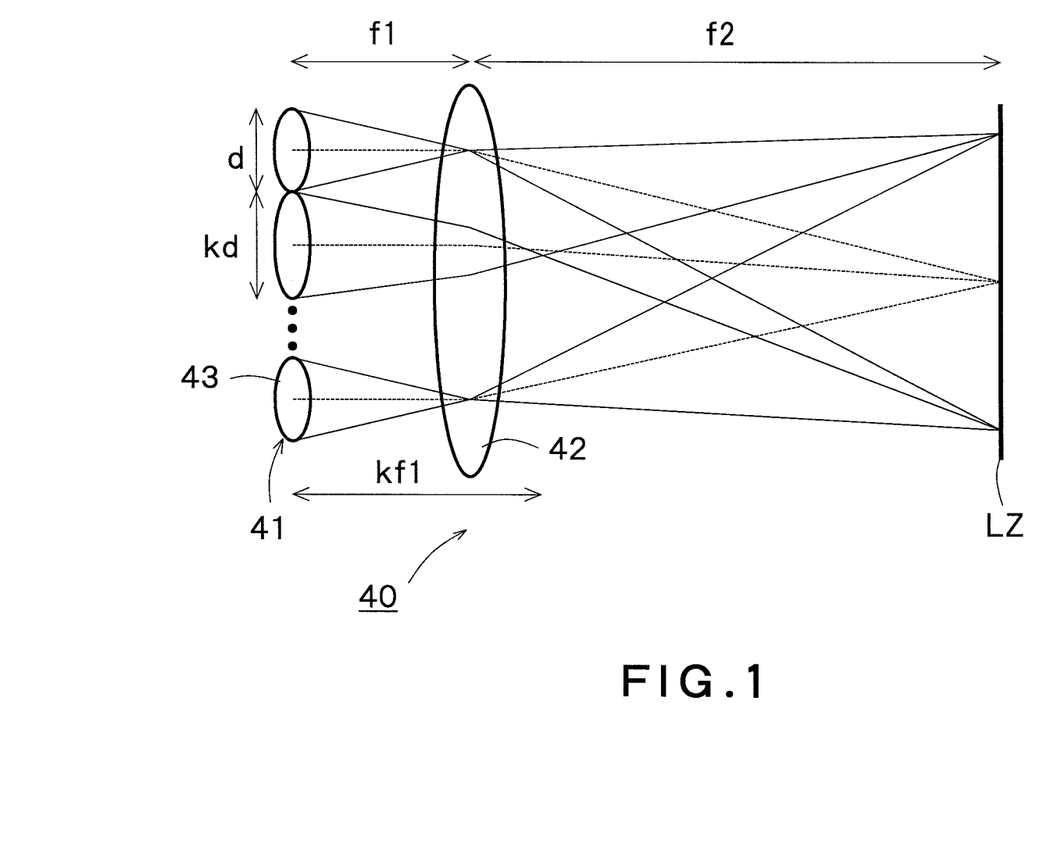
FIG. 1 is a diagram explaining the essential structure of an illumination device 40 according to a first embodiment of the present invention.

FIG. 1 is a diagram explaining the essential structure of an illumination device 40 according to a first embodiment of the present invention. The illumination device 40 of FIG. 1 is provided with a lens array 41 and a field lens 42. The lens array (a first lens array) 41 has a plurality of lens elements (first lens elements) 43 arranged vertically and horizontally, namely, in a first direction and in a second direction that intersects with the first direction. The first and second directions are typically two-dimensional directions orthogonal to each other. Each lens element 43 collects coherent light beams incident thereon from a laser source (not shown) and guides the collected coherent light beams to the field lens 42. The field lens 42 guides each of the coherent light beams that have passed through the lens elements 43 to the entire region of a specific zone that is an illumination zone LZ. The specific zone, or the illumination zone LZ is set closer to the focal plane of the field lens 42.

The lens elements 43 in the lens array 41 are preferably arranged as close to one another as possible. If there is a step between adjacent lens elements 43 due to a gap therebetween, coherent light beams may be scattered to reduce light utilization efficiency. It is therefore preferable to perform processing so as not to have a step caused by a gap. An example of this processing is to form the gap and the surrounding area into a cylindrical lens shape.

The lens element 43 may have a circular or rectangular surface. In the following description, the explanation is given in the case where the lens elements 43 have a circular surface.

In the present embodiment, the lens elements 43 of the lens array 41 have an irregular pitch. Here, the pitch is a distance between the centers of adjacent lens elements 43. When the lens elements 43 are in contact with each other, the pitch is roughly equal to the lens length, or the lens diameter, of each lens element 43.

To make the pitch of the lens elements 43 irregular is to make lens diameters of all the lens elements 43 irradiated with light from a laser source in the lens array 41 random. It is unnecessary, however, to make the pitch of all the lens elements 43 irradiated with light from a laser source completely random. The minimum requirement is that there are two or more lens elements 43 having different pitches in the lens elements 43 irradiated with light from a laser source. In the following description, the explanation is given in the case where there are two or more lens elements 43 having different lens diameters among the lens elements 43 of the lens array 41.

Two or more lens elements 43 having different lens diameters have the following relations: when the lens diameter and the focal length of one of the lens elements 43 are denoted as d and f, respectively, those of the other lens element(s) 43 are k×d and k×f, respectively (where k is a value larger than zero but other than 1).

As described later, there is a case where the entire region of the illumination zone LZ is illuminated with a coherent light beam that has passed through a lens element 43 having a lens diameter d and a focal length $f_1$. In this case, the entire region of the illumination zone LZ can be illuminated with a coherent light beam that passes through a lens element 43 having a lens diameter k×d and a focal length k×$f_1$, no matter how k varies, the reason for which will be explained below.

Figure 2:
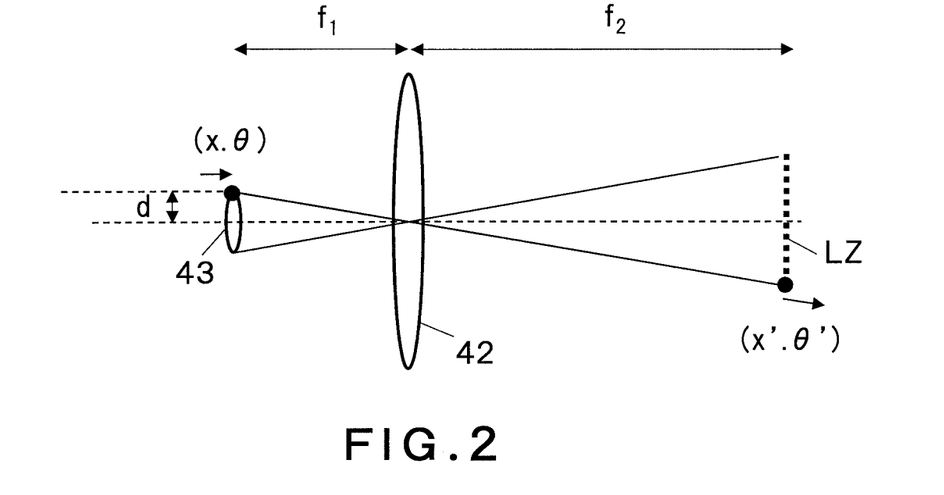
FIG. 2 is a diagram showing an optical system of an illumination device 40 provided with a lens element 43 having a lens diameter d and a focal length $f_1$, and a field lens 42 having a focal length $f_2$.

FIG. 2 is a diagram showing an optical system of an illumination device 40 provided with a lens element 43 having a radius d and a focal length $f_1$, and a field lens 42 having a focal length $f_2$. In FIG. 2, the illumination zone LZ is set at the position of the focal length $f_2$ of the field lens 42.

The ray tracing determinant of the optical system of FIG. 2 is expressed by the following expression (1).

[Expression 1]

$$\begin{pmatrix} x' \\ \theta' \end{pmatrix} = \begin{pmatrix} 1 & f_2 \\ 0 & 1 \end{pmatrix} \begin{pmatrix} 1 & 0 \\ -\frac{1}{f_2} & 1 \end{pmatrix} \begin{pmatrix} 1 & f_1 \\ 0 & 1 \end{pmatrix} \begin{pmatrix} 1 & 0 \\ -\frac{1}{f_1} & 1 \end{pmatrix} \begin{pmatrix} x \\ \theta \end{pmatrix} \quad (1)$$

In the expression (1), the fifth term (x, θ) in the right side indicates a beam position and a beam angle on the lens element 43, and (x', θ') in the left side indicates a beam position and a beam angle on the illumination zone LZ.

In the expression (1), the fourth term in the right side is the determinant of the lens element 43, the third term in the right side is the determinant of the optical path between the lens element 43 and the field lens 42, the second term in the right side is the determinant of the field lens 42, and the first term in the right side is the determinant of the optical path between the field lens 42 and the illumination zone LZ. By multiplying these four determinants, the beam position and the beam angle on the illumination zone LZ are obtained.

The right side of the expression (1) is calculated to obtain the following expression (2) where x=d and θ=0.

[Expression 2]

$$\begin{pmatrix} x' \\ \theta' \end{pmatrix} = \begin{pmatrix} -\frac{f_2}{f_1} d \\ -\frac{d}{f_1} \end{pmatrix} \quad (2)$$

Figure 3:
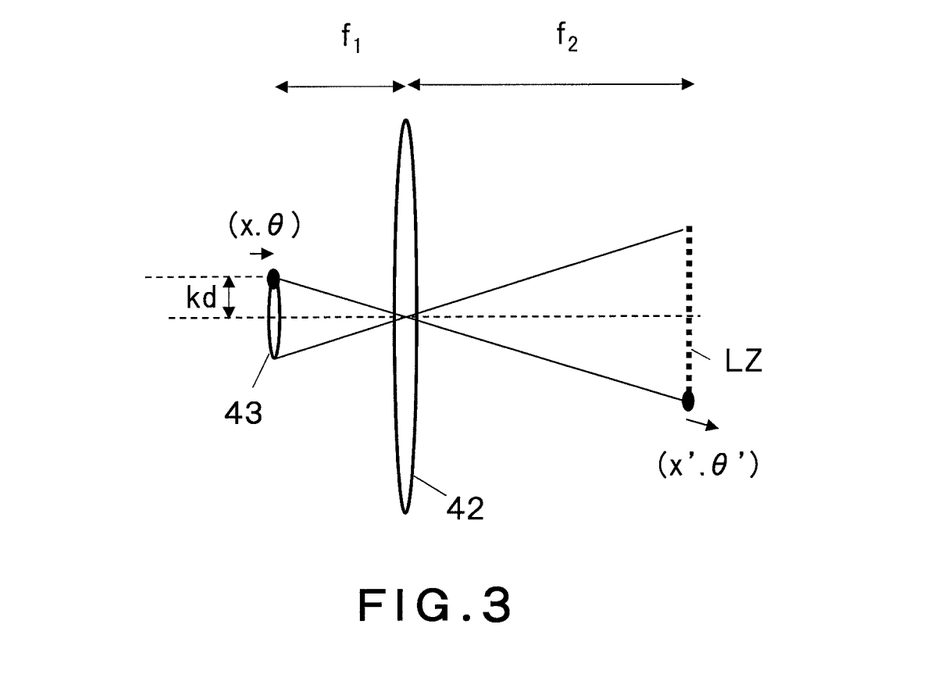
FIG. 3 is a diagram showing an optical system of an illumination device 40 provided with a lens element 43 having a radius k×d and a focal length $f_{1'}$, and a field lens 42 having a focal length $f_2$.

FIG. 3 is a diagram showing an optical system of an illumination device 40 provided with a lens element 43 having a radius k×d (where k is a value larger than zero but other than 1) and a focal length f'$_1$, and a field lens 42 having a focal length f$_2$. In FIG. 3, the positional relationship among the lens element 43, the field lens 42, and the illumination zone LZ is the same as in FIG. 2.

The ray tracing determinant of the optical system of FIG. 3 is expressed by the following expression (3).

[Expression 3]

$$\begin{pmatrix} x' \\ \theta' \end{pmatrix} = \begin{pmatrix} 1 & f_2 \\ 0 & 1 \end{pmatrix} \begin{pmatrix} 1 & 0 \\ -\frac{1}{f_2} & 1 \end{pmatrix} \begin{pmatrix} 1 & f_1 \\ 0 & 1 \end{pmatrix} \begin{pmatrix} 1 & 0 \\ -\frac{1}{f'_1} & 1 \end{pmatrix} \begin{pmatrix} x \\ \theta \end{pmatrix} \quad (3)$$

The right side of the expression (3) is the same as that of the expression (1) except for the fourth term only. The fourth term is the determinant of the lens element 43 having the focal length of f'$_1$. The right side of the expression (3) is calculated to obtain the following expression (4) where x=k×d and θ=0.

[Expression 4]

$$\begin{pmatrix} x' \\ \theta' \end{pmatrix} = \begin{pmatrix} -\frac{f_2}{f'_1} kd \\ \left\{-\frac{1}{f_2}\left(1 - \frac{f_1}{f'_1}\right) - \frac{1}{f'_1}\right\} kd \end{pmatrix} \quad (4)$$

Having the above-mentioned expressions (2) and (4), a requirement for optical images to have the same height in the illumination zone LZ is to meet the following expression (5).

[Expression 5]

$$-\frac{f_2}{f_1} d = -\frac{f_2}{f'_1} kd \quad (5)$$

The expression (5) is transformed into an expression (6).

$$f'_1 = k f_1 \quad (6)$$

The expression (6) indicates the following matters. There is a case where the entire region of the illumination zone LZ is illuminated with a coherent light beam that has passed through a reference lens element 43 having a lens diameter d and a focal length f$_1$ among the lens elements 43 of the lens array 41. In this case, when the lens diameter d of a lens element 43 is multiplied by k (where k is a value larger than zero but other than 1), the focal length f$_1$ of the lens element 43 is also multiplied by k, thereby illuminating the entire region of the illumination zone LZ.

As understood from the expression (6), even in the case where the lens diameters of the lens elements 43 in the lens array 41 are changed to different values, the entire region of the illumination zone LZ can be illuminated via the lens array 41 by changing the focal lengths of the lens element 43 in accordance with the different lens diameters.

It is assumed that, without changing the focal length, the lens diameters of the lens elements 43 in the lens array 41 are changed to different values. In this case, it occurs that a coherent light beam that has passed though the field lens 42 via each lens element 43 illuminates only part of the illumination zone LZ or a region larger than the illumination zone LZ due to the different lens diameters, which causes uneven brightness in the illumination zone LZ. By contrast, in the present embodiment, when changing the lens diameters of the lens elements 43, by changing the focal lengths thereof accordingly, it is possible to surely illuminate the entire region of the illumination zone LZ constantly with coherent light beams that have passed through the lens elements 43, thereby uniforming the brightness of the illumination zone LZ.

As described above, according to the present embodiment, while the brightness of the entire region of the illumination zone LZ is uniformed, the pitch of at least a part of a plurality of lens elements 43 in the lens array 41, that is, the lens diameter is made irregular or random. Therefore, an interference pattern caused by coherent light beams becomes inconspicuous in the illumination zone LZ.

In the example explained above, the lens diameter of at least part of a plurality of lens elements 43 in the lens array 41 is made irregular or random. However, the present embodiment is applicable to optical elements other than the lens array 41, such as a cylindrical lens.

Figure 4:
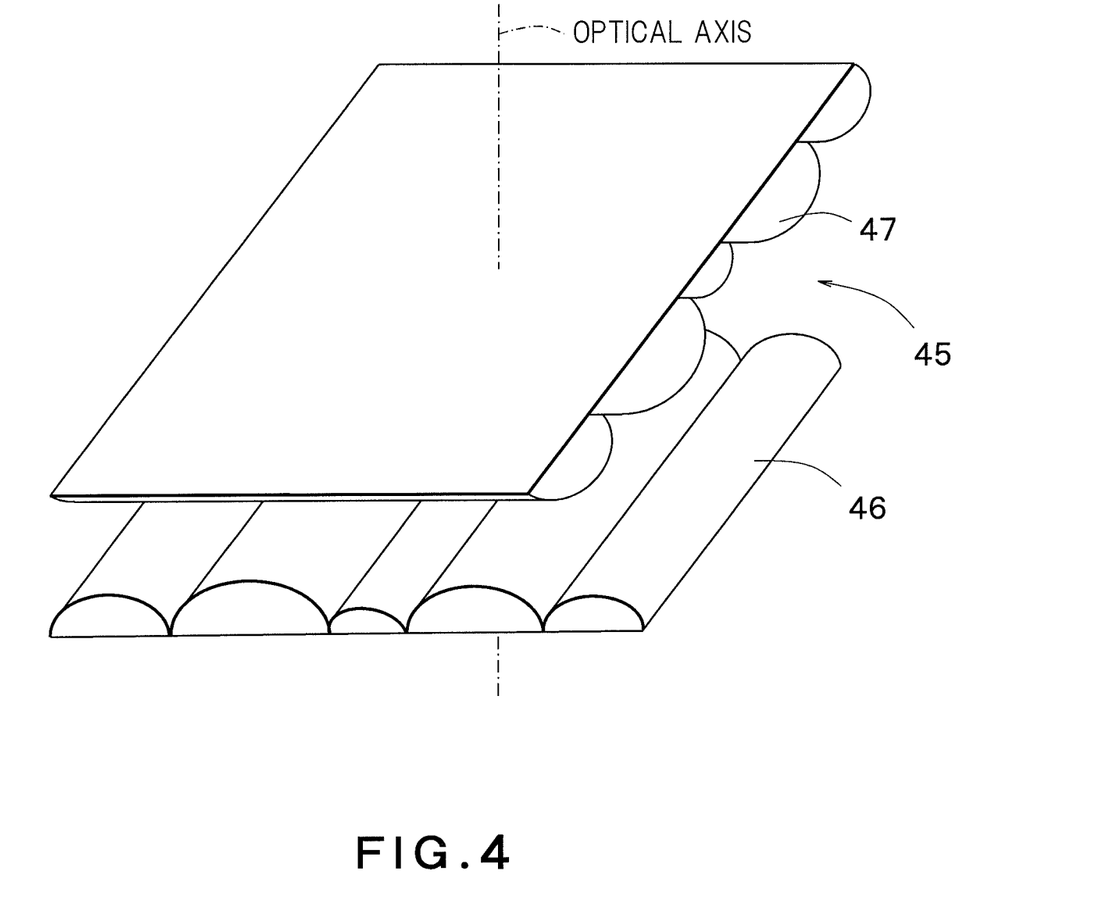
FIG. 4 is a view of a cylindrical lens 45, as an example.

FIG. 4 is a view of a cylindrical lens 45, as an example. The cylindrical lens 45 of FIG. 4 has a first cylindrical lens unit 46 and a second cylindrical lens unit 47 arranged on an optical axis. The first cylindrical lens unit 46 has a plurality of semi-cylindrical lens elements arranged at an irregular pitch in the first direction. The second cylindrical lens unit 47 has a plurality of semi-cylindrical lens elements arranged at an irregular pitch in the second direction.

The first and second cylindrical lens units 46 and 47 both are not required to have an irregular lens pitch for the respective entire lens units but required to have an irregular pitch, or different lens diameters, for at least part of the respective lens units. For the lenses of the different lens diameters in each lens unit, the lens diameter and the focal length are set to meet the relationship expressed by the above-mentioned expression (6). Therefore, an interference pattern caused by coherent light beams becomes inconspicuous in the illumination zone LZ while keeping brightness evenly in the entire region of the illumination zone LZ.

The example shown in FIG. 4 is that the first and second cylindrical lens units 46 and 46 are arranged in order on the optical axis. Not to limited to this arrangement, a grid-like cylindrical lens having the integrated first and second cylindrical lens units 46 and 47 may be produced. The grid-like cylindrical lens can be produced by setting the grid pitch uneven in both of the first and second directions, and adjusting the focal length of a lens portion of each grid line in accordance with the uneven grid pitch.

The above-mentioned illumination device 40 uses a laser source that emits coherent light beams, as the light source. The reasons for using the laser source are such that the laser source has a long life compared to other light sources, with a lower maintenance cost and compactness, and excellent straightness of coherent light beams, which improves light utility efficiency.

However, coherent light beams such as laser beams have a problem of speckle generation. Speckle is a spotted pattern which is observed due to interference between coherent light beams such as laser beams. When coherent light beams such as laser beams are used for a projection apparatus, an interference fringe generated when light beams cross each other in the projection apparatus may be projected onto a screen. Or scattered coherent light beams on the screen interfere with each other, so that they are observed as spotted luminance unevenness, i.e. brightness unevenness. Such phenomena may cause reduction in the quality of projected images, physiologically adverse effects on an observer, etc.

The cause of speckle on screen is different from that of an interference pattern on the illumination zone LZ discussed above, that is, the scattering on the screen surface. Therefore, speckle is observed even if the lens elements 43 are arranged to have an irregular pitch, or different lens diameters. Another measure is thus required to deal with the problem of speckle on screen.

Figure 5:
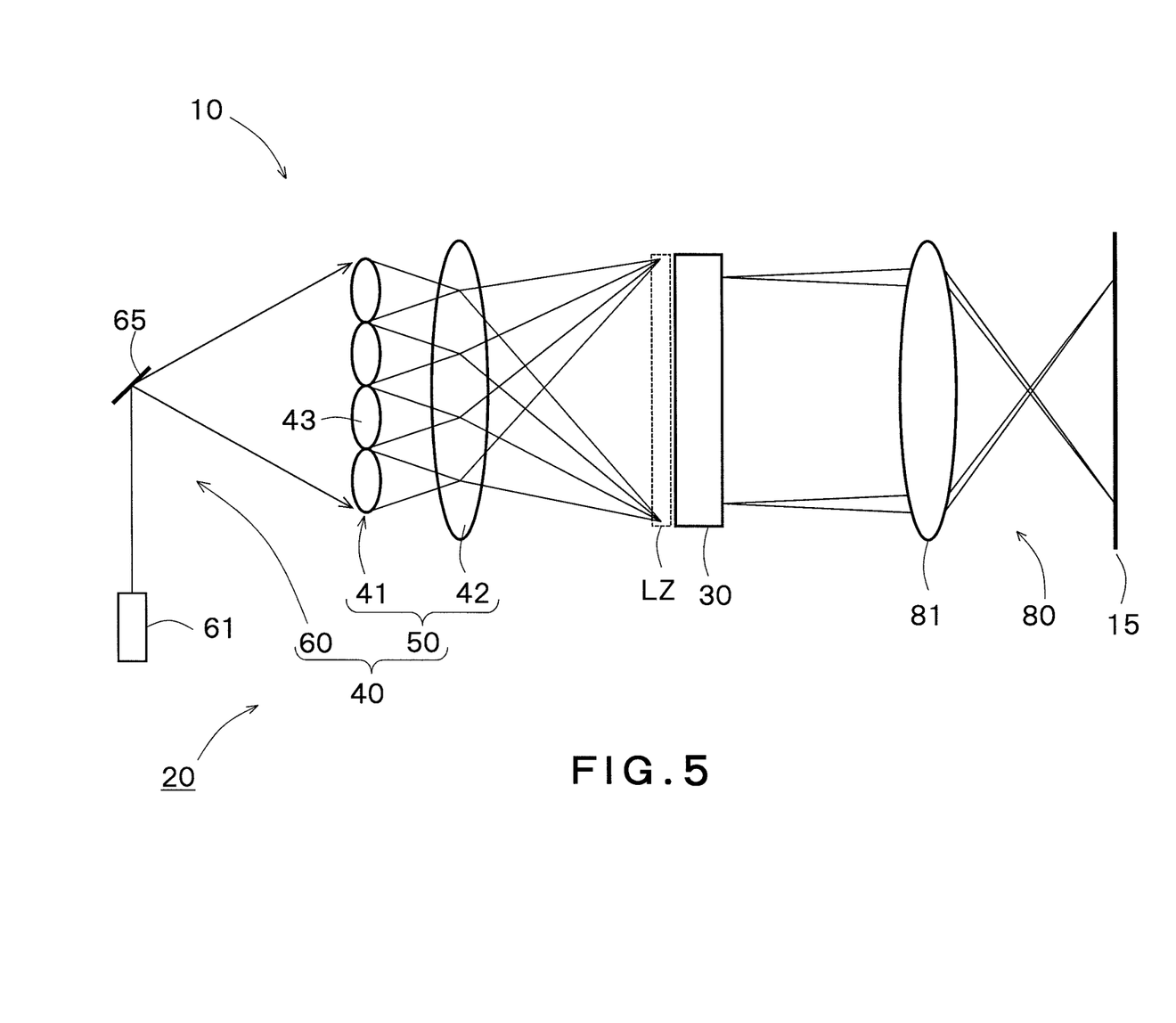
FIG. 5 is a diagram showing an example of the outline structure of a projection apparatus 20 having a built-in illumination device 40 for making speckles inconspicuous.

FIG. 5 is a diagram showing an example of the outline structure of a projection apparatus 20 having a built-in illumination device 40 for making speckles inconspicuous. The projection apparatus 20 of FIG. 5 is provided with an optical device 50, an irradiation unit 60, a spatial light modulator 30, and a projection optical system 80. The illumination device 40 is configured by using the optical device 50 and the irradiation unit 60. An optical module 10 is configured by using a scanning device 65 which is built in the irradiation unit 60 as described later and the scanning device 65.

The optical device 50 has a lens array 41 having a plurality of lens element 43 and also has a field lens 42. In the lens array 41, in the same way as shown in FIG. 1, the pitch is irregular, or the lens diameter is different, for at least part of the lens elements 43, each lens element 43 satisfying the relationship expressed by the expression (6).

The irradiation unit 60 emits a coherent light beam to the lens array 41 so that the coherent light beam scans the surfaces of a plurality of lens element 43 in the lens array 41. The irradiation unit 60 has a laser source 61 that emits a coherent light beam and a scanning device 65 that scans the surfaces of the lens element 43 in the lens array 41 with the coherent light beam emitted from the laser source 61.

The scanning devise 65 changes the reflection angle of the incident coherent light beam at a regular interval so that a reflected coherent light beam scans the lens array 41.

As the spatial light modulator 30, for example, a transparent-type liquid crystal microdisplay such as LCOS (Liquid Crystal on Silicon) can be used. In this case, the liquid crystal microdisplay is illuminated by the illumination device 40 in the plane direction to allow coherent light beams pass therethrough selectively per pixel. In this way, the liquid crystal microdisplay generates a modulated image thereon. The generated modulated image, i.e. an image light is varied its size by the projection optical system 80 and projected onto the diffuser screen 15. Speckle patterns of the modulated image projected onto the diffuser screen 15 vary with time, thus speckles become invisible.

As the spatial light modulator 30, a reflection-type microdisplay can also be used. In this case, a modulated image is generated by reflected light beams at the spatial light modulator 30 so that a plane on the spatial light modulator 30 illuminated with coherent light beams from the illumination device 40 and an emitting plane for light beams of an image, i.e. reflected light beams, of a modulated image generated by the spatial light modulator 30 become the same plane. When utilizing such reflected light beams, it is possible to use a MEMS (Micro Electro Mechanical Systems) device such as a DMD (Digital Micromirror Device) as the spatial light modulator 30. In the apparatus disclosed in Japanese Patent Laid-Open No. 2008-224760 described above, a DMD is used as the spatial light modulator 30. In addition, a transmission-type liquid crystal panel can be used as the spatial light modulator 30.

Moreover, it is preferable that the incidence plane of the spatial light modulator 30 has the same shape and size as the illumination zone LZ that is illuminated with coherent light beams by the illumination device 40. The reason is that coherent light beams from the illumination device 40 can be used for displaying an image on the diffuser screen 15 at high utilization efficiency.

The projection optical system 80 that projects a modulated image generated by the spatial light modulator 30 on the diffuser screen 15 has the projection lens 81 having, for example, a convex shape on both surfaces. A modulated image generated by the spatial light modulator 30 is refracted by the projection lens 81 and projected onto the diffuser screen 15 as a modulated image 71. The size of the modulated image 71 projected onto the diffuser screen 15 can be adjusted with the diameter of the projection lens 81, the distance between the projection lens 81 and the spatial light modulator 30, the distance between the projection lens 81 and the diffuser screen 15, etc. The diffuser screen 15 of FIG. 1 is a transmission type to diffuse a projected modulated image light. The diffuser screen 15 may be a reflection type.

The spatial light modulator 30 can generate a variety of modulated images. By generating modulated images at the spatial light modulator 30 and illuminating the illumination zone LZ with the modulated images, a variety of modulated images can be projected onto the diffuser screen.

The laser source 61 may be a plurality of laser sources 61 that emit laser beams of different wavelength ranges. When a plurality of laser sources 61 are used, it is arranged that the same point on the scanning device 65 is irradiated with a laser beam from each laser source 61. Therefore, the lens array 41 is illuminated with reproduction illumination light beams having illumination colors of the laser sources 61 mixed with one another.

The laser source 61 may be a single-color laser source 61 or a plurality of laser sources 61 of different emission colors, for example, red, green and blue. When a plurality of laser sources 61 are used, the laser sources 61 are arranged so that coherent light beams from the laser sources 61 are emitted to a single point on the scanning device 65. With this arrangement, coherent light beams from the laser sources 61 are reflected by the scanning device 65 at reflection angles corresponding to the incidence angles of coherent light beams from the laser sources 61, incident on the lens array 41, diffracted by the lens array 41 separately, and superimposed on one another on the illumination zone LZ, thereby having a combined color. If the laser source 61 is configured with a plurality of laser sources of, for example, red, green and blue, the combined color is white. Or a scanning device 65 may be provided for each laser source 61.

For example, when illuminating with white, a color much closer to white may be reproduced by providing another laser source, for example, a laser source that emits light in yellow, other than red, green and blue. Therefore, there is no particular limitation on the type of the laser source 61 provided in the irradiation unit 60.

When creating a color modulated image, a variety of realization techniques are considered. When the light modulator 30 is configured with LCOS or the like equipped with a color filter for each pixel, by illuminating the illumination zone LZ with white light, it is possible to create a color modulated image at the light modulator 30.

Or it may be arranged that a light modulator 30 to generate a red modulated image, a light modulator 30 to generate a green modulated image, and a light modulator 30 to generate a blue modulated image may be closely arranged, and three illumination zones LZ to illuminate the three light modulators 30, respectively, may be successively illuminated with diffused light from the lens array 41. Therefore, it is possible to combine three-color modulated images generated by the three light modulators 30 to create a color modulated image. Instead of such time division driving, three-color modulated images generated by three light modulators 30 simultaneously may be combined by using a prism or the like to create a color modulated image.

The projection optical system 80 described above is provided mainly for the purpose of projecting a modulated image of the light modulator 30 onto the diffuser screen 15. By providing the diffuser screen 15, speckles are superimposed on one another and averaged, and as a result, become inconspicuous.

The scanning device 65 changes the propagation direction of a coherent light beam with time to direct the coherent light beam in different directions so that the coherent light beam does not travel in the same direction. This results in that the coherent light beam, the propagation direction of which is changed by the scanning device 65, scans the incidence surface of the lens array 41 of the optical device 50.

It is preferable that coherent light beams emitted from the scanning devise 65 are parallel beams. This is because, in the case of the parallel beams, as shown in FIG. 1, the lens elements 43 in the lens array 41 can collect the coherent light beam in the direction of the field lens 42. If coherent light beams emitted from the scanning devise 65 are diffused light beams, coherent light beams directed in the direction of the field lens 42 from each lens element 43 diverge in different directions, so that the field lens 42 cannot illuminate the entire region of the illumination zone LZ. It is therefore preferable that the scanning devise 65 is provided with a collimator optical system (not shown) for converting emitted light beams into parallel beams. Or another lens array may be provided between the lens array 41 and the field lens 42.

In this way, the projection apparatus 60 illuminates the illumination zone LZ with coherent light beams. For example, when the laser source 61 has a plurality of laser sources 61 that emit laser beams at different colors, the illumination zone LZ is illuminated with respective colors. Therefore, when these laser sources 61 emit light simultaneously, the illumination zone LZ is illuminated with white that is a mixture of three colors.

The above-mentioned irradiation unit 60 emits coherent light beams to the optical device 50 so that the coherent light beams scan the surfaces of the lens elements 43 in the lens array 41. A coherent light beam incident on a position in the lens array 41 from the irradiation unit 60 illuminates the entire region of the illumination zone LZ. However, the coherent light beams illuminate the illumination zone LZ in different directions. Moreover, since the position on the lens array 41 on which a coherent light beam is incident changes with time, the incidence direction of the coherent light beam to the illumination zone LZ also changes with time.

As described above, in the present embodiment, a coherent light beam continuously scans the lens array 41. Following to this, the incidence direction of a coherent light beam to the illumination zone LZ from the projection apparatus 60 via the optical device 50 also continuously changes. When the incidence direction of a coherent light beam to the illumination zone LZ from the optical device 50 changes slightly, for example, an angle less than 1°, a speckle pattern generated on the illumination zone LZ changes greatly, resulting in superimposition of speckle patterns with no correlation.

Accordingly, according to the present embodiment described above, the incidence direction of a coherent light beam changes with time at each position of the illumination zone LZ and this change occurs at a speed that is not covered by the resolution of human eyes. Therefore, if a screen is provided at the illumination zone LZ, speckles generated corresponding to respective incidence angles are superimposed on one another and averaged to be observed by an observer. Accordingly, speckles become inconspicuous effectively to an observer who observes an image displayed on the screen. In the case of the present embodiment, the spatial light modulator 30 is provided so as to be overlapped with the illumination zone LZ for projection from the spatial light modulator 30 to the diffuser screen 15 via the projection optical system 80. The advantage mentioned above is also applied to this case. That is, speckles generated on the diffuser screen 15 are superimposed on one another and averaged. Therefore, the speckles generated on the diffuser screen 15 become inconspicuous.

As described above, according to the present embodiment, the lens elements 43 in the lens array 41 are formed to have an irregular pitch, or different lens diameters, and different focal lengths in accordance with the irregular pitch. Therefore, an interference pattern in the illumination zone LZ caused by coherent light beams becomes inconspicuous. Moreover, the scanning devise 65 installed in the irradiation unit 60 scans the surfaces of the lens elements 43 with coherent light beams, thereby making the speckles inconspicuous in the illumination zone LZ and on the screen.

Illumination intensity to the illumination zone LZ tends to be uneven, especially, when a coherent light beam from the scanning devise 65, which is incident on the lens elements 43, has a beam spot that covers two or more lens elements 43. In such a case, it is important to form the lens elements 43 in the lens array 41 to have an irregular pitch, namely, different lens diameters.

Second Embodiment

In a second embodiment which will be explained below, there is another lens array in addition to the lens array 41.

Figure 7:
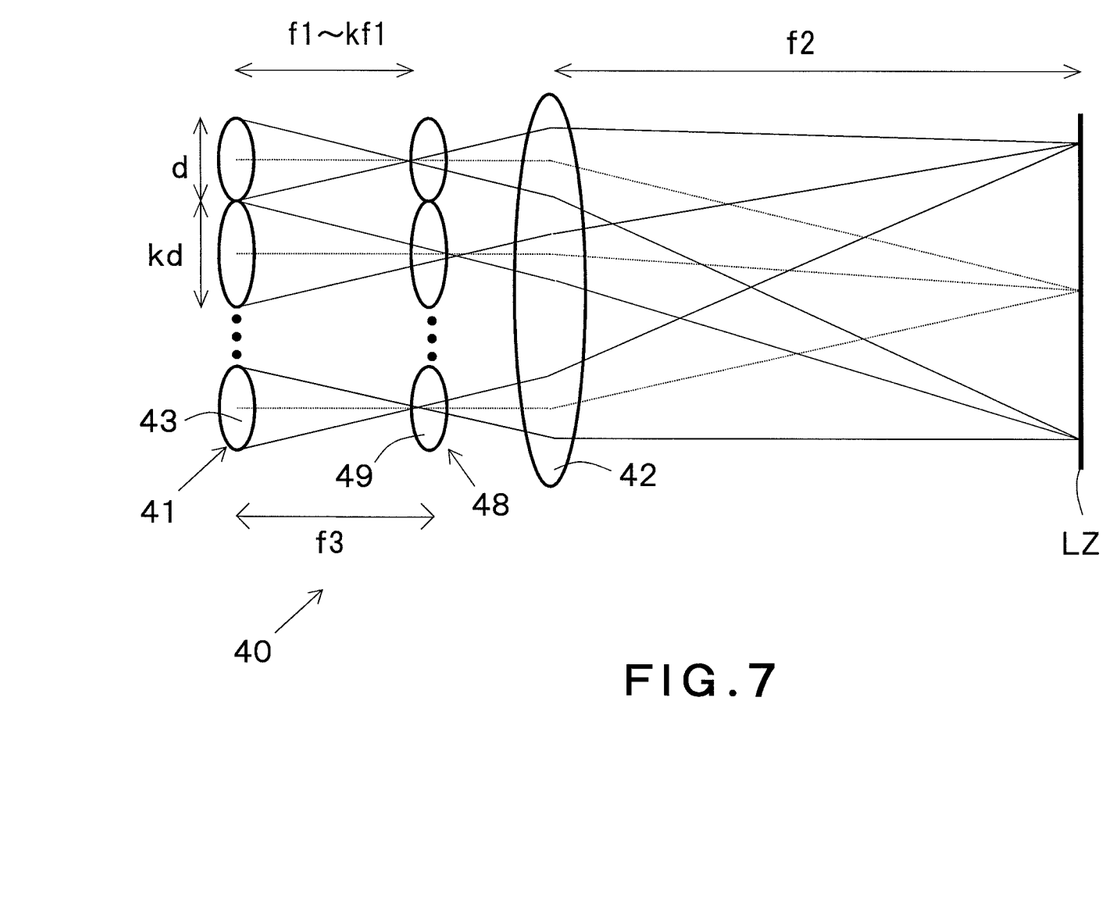
FIG. 7 is a diagram explaining the essential structure of an illumination device 40 according to a second embodiment of the present invention.

An illumination device 40 according to the second embodiment is provided with a first lens array 41 that has the shape and optical characteristics identical to those of the lens array 41 of the first embodiment. First lens elements 43 in the first lens array 41 also have the shape and optical characteristics identical to those of the lens elements 43 in the lens array 41 of the first embodiment.

FIG. 7 is a diagram explaining the essential structure of the illumination device 40 according to the second embodiment of the present invention. The illumination device 40 of FIG. 7 has a second lens array 48 in the optical path between the first lens array 41 and the field lens 42. The second lens array 48 has a plurality of second lens elements 49 associated with the first lens elements 43.

Each of the second lens elements 49 has the same lens diameter as the associated first lens element 43. The second lens elements 49 have the same focal length f3. Namely, each second lens element 49 has the same lens diameter as the associated first lens element 43 while the second lens elements 49 have the same focal length f3.

The optical path length between the associated first and second lens elements 43 and 49 is set to be equal to the focal length f3 of the second lens element 49. Namely, each second lens element 49 is located on a position apart from the first lens element 43 by its own focal length f3.

As explained in the first embodiment, the first lens elements 43 in the first lens array 41 have different lens diameters and different focal lengths. Therefore, an interference pattern caused by coherent light beams becomes inconspicuous in the illumination zone LZ.

Each of the second lens elements 49 in the second lens array 41 has the same lens diameter as the associated first lens element 43. Therefore, many of the light beams that have passed through the first lens element 43 pass through the associated second lens element 49.

The second lens elements 49 have the same focal length f3, so that light beams that have been obliquely incident on the first lens elements 43 can be converted into parallel beams. With this mechanism, even if the light source 61 is not an ideal point light source, light beams can converge on the illumination zone LZ efficiently, so that illumination light is restricted from being out of focus in the illumination zone LZ.

As described above, whereas the first lens elements 43 in the first lens array 41 have a function of making speckles inconspicuous in the illumination zone LZ, the second lens elements 49 in the second lens array 48 have a function of restricting illumination light from being out of focus in the illumination zone LZ.

When coherent light beams from the light source 61 are out of focus, many of the coherent light beams are obliquely incident on the first lens elements 43. It is highly likely that the coherent light beams obliquely incident on the first lens element 43 do not pass through the field lens 42 or, even if passing therethrough, the coherent light beams illuminate the outside of the illumination zone LZ, resulting in weak and uneven light intensity in the illumination zone LZ.

In the present embodiment, the second lens elements 49 each having the same lens diameter as the associated first lens element 43 and all having the same focal length f3 are arranged apart from the first lens elements 43 by their own focal length f3. With this arrangement, most of the coherent light beams obliquely incident on the first lens elements 43 can be converted into parallel beams via the associated second lens elements 49. The coherent light beams that have passed through the second lens elements 49 illuminate the illumination zone LZ via the field lens, with uniform light intensity.

As described above, in the second embodiment, the second lens array 48 is provided between the first lens array 41 and the field lens, so that the illumination zone LZ can be uniformly illuminated even if coherent light beams from the light source 61 are out of focus.

Third Embodiment

Figure 8:
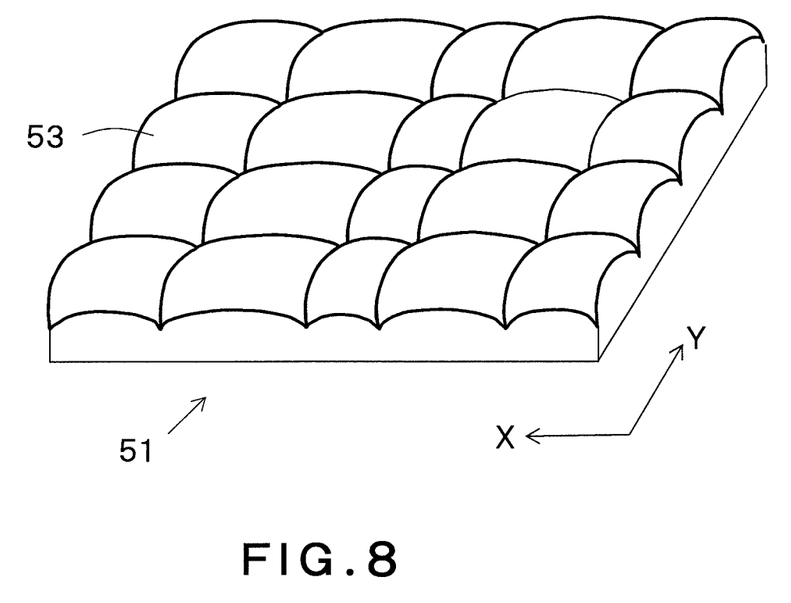
FIG. 8 is a view showing an example of a toroidal lens array.
Figure 9:
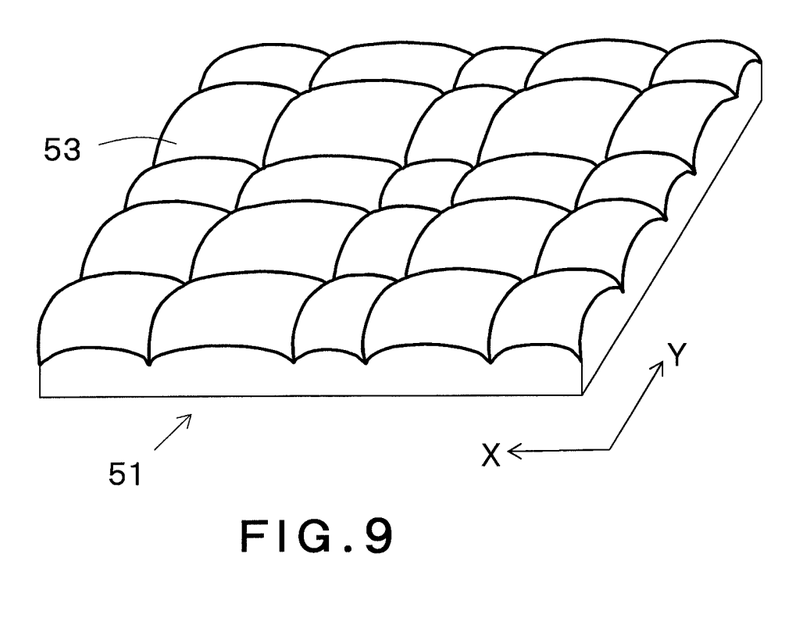
FIG. 9 is a view showing another example of the toroidal lens array.

In the lens array (first lens array) 41 in the above-described first and second embodiments 8, light beams incident on the joints between the lens elements 43 are not used efficiently, hence become useless. It is therefore desirable that there are no joints between the lens elements 43. It is thus effective to use, for example, the cylindrical lens 45 shown in FIG. 4 as the lens array (first lens array) 41. As another realization means, it is also effective to use a toroidal lens such as shown in FIGS. 8 and 9 as the lens array (first lens array) 41. Here, the toroidal lens is a specific lens having a toroidal surface on at least either side of the lens. The toroidal surface is a specific surface that has curvature different in x and y directions, such as the surface of a barrel and a doughnut.

Toroidal lens arrays 51 and 52 in FIGS. 8 and 9, respectively, have a plurality of toroidal lenses 53 arranged in a first direction X and a second direction Y intersecting with each other. Each toroidal lens 53 has a curved surface with continuously varying curvature in each of the first and second directions X and Y. Such toroidal lenses can be used for the lens array (first lens array) 41 by being arranged in the first and second directions X and Y.

The toroidal lenses are advantageous in that the gap between the lenses is small even if the pitch of the lenses is varied. Therefore, in the case of use in the lens array (first lens array) 41 having the lens elements (first lens elements) 43 with different lens diameters for part of the lens elements, it is possible to reduce the loss of light beams on the joints between the lenses.

In the toroidal lens array 51 of FIG. 8, whereas the pitch is different in at least part of the toroidal lenses 53 in the first direction X, the pitch is the same in the toroidal lenses 53 in the second direction Y. When the toroidal lens array 51 of FIG. 8 is used as the lens array (first lens array) 41, the toroidal lens array 51 of FIG. 8 is disposed so that its first direction X intersects at right angles with the optical axis of the lens array 41 such as shown in FIG. 1.

By contrast, in the toroidal lens array 52 of FIG. 9, the pitch is different in at least part of the toroidal lenses 53 in both of the first and second directions X and Y. In the toroidal lens array 52 of FIG. 9, it is supposed that the number of the toroidal lenses 53 successively arranged is different between the first and second directions X and Y. In this case, it is preferable to dispose the smaller number of toroidal lenses 53 in a direction that intersects at right angles with the optical axis of the lens array (first lens array) 41 such as shown in FIG. 1. The reason for this is that the gap between the lenses due to the different pitches can be restricted to be smaller.

The toroidal lens arrays 51 and 52 of FIGS. 8 and 9, respectively, can be produced by a filling process to fill a mold, in which a mold in accordance with an outer shape of the toroidal lens array 51 or 52 is previously made and a resin is filled inside of the mold to harden the resin.

As described above, according to the third embodiment, the toroidal lens array 51 or 52 is used as the lens array (first lens array) 41, so that the gap between the lenses becomes smaller, and hence the illumination zone can be illuminated more uniformly and brighter.

The present invention is not limited to the embodiments described above but includes various modifications conceivable by those skilled in the art. The effects of the present invention are also not limited to those described above. Namely, various additions, modifications and partial omissions may be made without departing from the conceptual idea and gist of present invention derived from those defined in the accompanying claims and their equivalents.

The invention claimed is:

1. An illumination device comprising:
   a plurality of first lens elements to collect incident light beams;
   a field lens to guide each of the light beams that have passed through each of the plurality of first lens elements to an entire region of an illumination zone;
   a light source to emit a coherent light beam; and
   a scanning device to change a travel direction of the coherent light beam emitted from the light source to scan the plurality of first lens elements with the coherent light beam,
   wherein the field lens has a predetermined focal length and is arranged away from the illumination zone by a distance that corresponds to the focal length,
   wherein the plurality of first lens elements include at least two first lens elements having different lens diameters from each other,
   wherein when one of the two first lens elements has a lens diameter d and a focal length f, another of the two first lens elements has a lens diameter kxd, where k is a value larger than zero but other than 1, and a focal length kxf,
   wherein at least one of the plurality of first lens elements diffuses the coherent light beam from the scanning device to illuminate an entire region of the illumination zone so that an angle of the coherent light beam incident on respective points of the illumination zone changes with time, and
   wherein the scanning device changes the travel direction of the coherent light beam emitted from the light source so that an angle of the coherent light beam incident on the plurality of first lens elements changes with time, and
   wherein a pitch, which is a distance between centers of adjacent first lens elements, differs among one part of the plurality of the first lens elements, and is the same among another part of the plurality of the first lens elements.

2. The illumination device of claim 1, wherein the plurality of first lens elements comprise two or more first lens elements arranged in a first direction and two or more first lens elements arranged in a second direction that intersects with the first direction,
   wherein at least part of the two or more first lens elements that are arranged in the first direction have a lens diameter that is different from the other first lens elements, and
   wherein at least part of the two or more first lens elements that are arranged in the second direction have a lens diameter that is different from the other first lens element.

3. The illumination device of claim 2, wherein the plurality of first lens elements is a lens array having two or more first lens elements arranged in each of the first and second directions.

4. The illumination device of claim 3, wherein the plurality of first lens elements have a circular or rectangular shape in a plan view.

5. The illumination device of claim 2, wherein the plurality of first lens elements have a semi-cylindrical shape in a cross-section view, and wherein the plurality of first lens elements comprise a first cylindrical lens unit having two or more first lens elements arranged in the first direction and a second cylindrical lens unit having two or more first lens elements arranged in the second direction.

6. The illumination device of claim 2, wherein the plurality of first lens elements is a toroidal lens array having a plurality of toroidal lenses arranged in a direction in which the plurality of first lens elements are arranged, wherein at least part of the toroidal lenses that are arranged in the direction have different pitches.

7. The illumination device of claim 6, wherein the toroidal lens array comprises a plurality of toroidal lenses arranged in the first direction and the second direction intersecting with each other, wherein at least part of the toroidal lenses that are arranged in the first direction have different pitches and wherein the toroidal lenses that are arranged in the second direction have a constant pitch.

8. The illumination device of claim 6, wherein the toroidal lens array comprises a plurality of toroidal lenses arranged in the first direction and the second direction intersecting with each other, wherein at least part of the toroidal lenses that are arranged in each direction have different pitches.

9. The illumination device of claim 8, wherein when a number of the plurality of toroidal lenses arranged in the first direction is different from a number of the plurality of toroidal lenses arranged in the second direction, the first plurality of lens elements comprises the toroidal lenses that are arranged in one of the first and second directions which has a smaller number of the toroidal lenses.

10. The illumination device of claim 1, wherein the illumination zone is set at or proximate a focal plane of the field lens.

11. The illumination device of claim 1, further comprising:
    a plurality of second lens elements disposed in an optical path between the plurality of first lens elements and the field lens, the plurality of second lens elements corresponding to the plurality of first lens elements,
    wherein each of the plurality of second lens elements has a lens diameter equal to the corresponding first lens element, the plurality of second lens elements having a common focal length, and
    wherein an optical path length between the corresponding first and second lens elements is equal to the common focal length.

12. A projection apparatus comprising:
    the illumination unit of claim 1;
    a spatial light modulator disposed in the illumination zone, to generate a modulated image when illuminated with a coherent light beam that passes through the illumination zone; and
    a projection optical system to project the modulated image onto a diffuser plane.

13. The illumination device of claim 1, wherein the coherent light beam from the scanning device, which is incident on the first lens elements, has a beam spot that covers two or more first lens elements.

14. An optical module comprising:
    a plurality of lens elements to collect incident light beams emitted from a light source;
    a field lens to guide each of the light beams that have passed through each of the plurality of lens elements to an entire region of an illumination zone,
    wherein the field lens has a predetermined focal length and is arranged away from the illumination zone by a distance that corresponds to the focal length; and a scanning device to change a travel direction of the coherent light beams emitted from light source to scan the plurality of lens elements with the coherent light beams, wherein at least part of the plurality of lens elements has a lens diameter that is different from the other lens elements, wherein when one of two lens elements having different lens diameters has a lens diameter d and a focal length f, another of the two lens elements has a lens diameter kxd, where k is a value larger than zero but other than 1, and a focal length kxf, wherein at least one of the plurality of lens elements diffuses the coherent light beam from the scanning device to illuminate an entire region of the illumination zone so that an angle of the coherent light beam incident on respective points of the illumination zone changes with time, and wherein the scanning device changes the travel direction of the coherent light beam emitted from the light source so that an angle of the coherent light beam incident on the plurality of lens elements changes with time, and wherein a pitch, which is a distance between centers of adjacent first lens elements, differs among one part of the plurality of the first lens elements, and is the same among another part of the plurality of the first lens elements.

* * * * *